(12) United States Patent
Monti

(10) Patent No.: US 7,591,364 B2
(45) Date of Patent: Sep. 22, 2009

(54) METHOD AND AN APPARATUS FOR ORDERED SUPPLY OF CONTAINERS TO AN AUTOMATIC MACHINE

(75) Inventor: Giuseppe Monti, Pianoro (IT)

(73) Assignee: Marchasini Group S.p.A., Pianoro (Bologna) (IT)

( * ) Notice: Subject to any disclaimer, the term of this patent is extended or adjusted under 35 U.S.C. 154(b) by 0 days.

(21) Appl. No.: 12/116,991

(22) Filed: May 8, 2008

(65) Prior Publication Data
US 2008/0283370 A1 Nov. 20, 2008

(30) Foreign Application Priority Data
May 18, 2007 (IT) .......................... BO2007A0362

(51) Int. Cl.
*B65G 47/26* (2006.01)
(52) U.S. Cl. ...................................... 198/444; 198/443
(58) Field of Classification Search ................. 198/443, 198/444, 449, 453, 446, 459.5, 460.1, 803.14
See application file for complete search history.

(56) References Cited

U.S. PATENT DOCUMENTS

| | | | | |
|---|---|---|---|---|
| 3,759,368 A | * | 9/1973 | Rose et al. | 198/444 |
| 4,042,098 A | * | 8/1977 | D'Agnolo et al. | 198/443 |
| 4,082,177 A | * | 4/1978 | Aidlin et al. | 198/453 |
| 4,165,809 A | * | 8/1979 | Klein et al. | 198/444 |
| 4,917,562 A | * | 4/1990 | Colli et al. | 198/444 |
| 5,299,693 A | * | 4/1994 | Ubaldi et al. | 198/444 |
| 5,423,431 A | * | 6/1995 | Westin | 198/443 |
| 6,772,871 B2 | * | 8/2004 | Hoeg | 198/444 |
| 7,028,829 B2 | * | 4/2006 | Buchi | 198/444 |

* cited by examiner

*Primary Examiner*—James R Bidwell
(74) *Attorney, Agent, or Firm*—William J. Sapone; Coleman Sudol Sapone P.C.

(57) ABSTRACT

This invention concerns a method and a corresponding apparatus for ordered supply of containers to an automatic machine, comprising following operating stages: preliminarily freely supplying containers into a plurality of trays borne by a first conveyor belt with vertical axis, in such a way as to create a single layer of loosely arranged containers in the trays with the longitudinal axis thereof oriented horizontally; subsequently detecting a position of each container of the single layer in the corresponding tray; picking up each container situated in the tray and subsequently releasing the container at a mouth of a relative inclined channel which is shaped such as to guide the container onto a corresponding underlying housing of a fixed plane, with the container resiting with a longitudinal axis thereof vertically arranged; subsequently translating a plurality of containers resting in the housings towards corresponding facing seatings associated to a second conveyor belt having a vertical axis; and finally supplying the containers which are positioned in the seatings of the second conveyor belt to an associated machine.

17 Claims, 3 Drawing Sheets

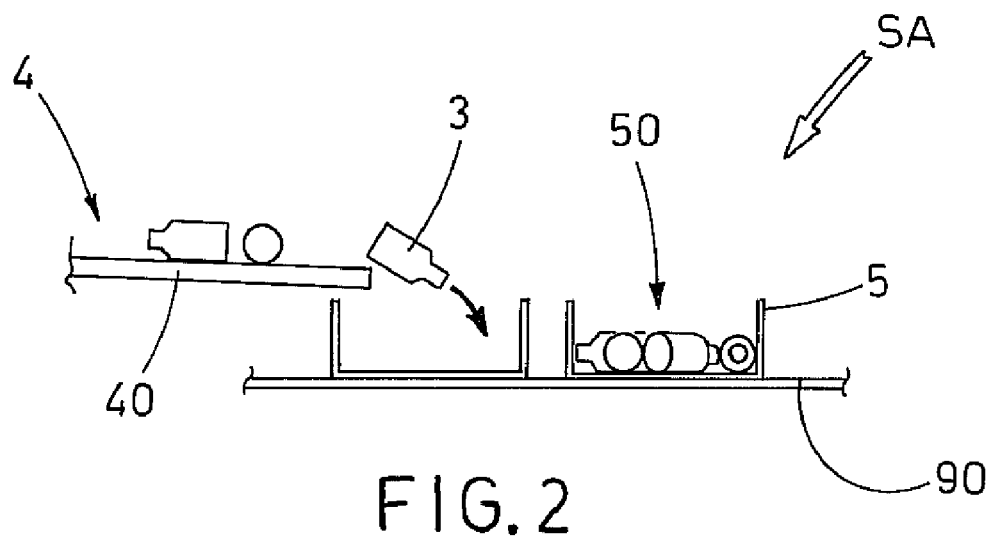
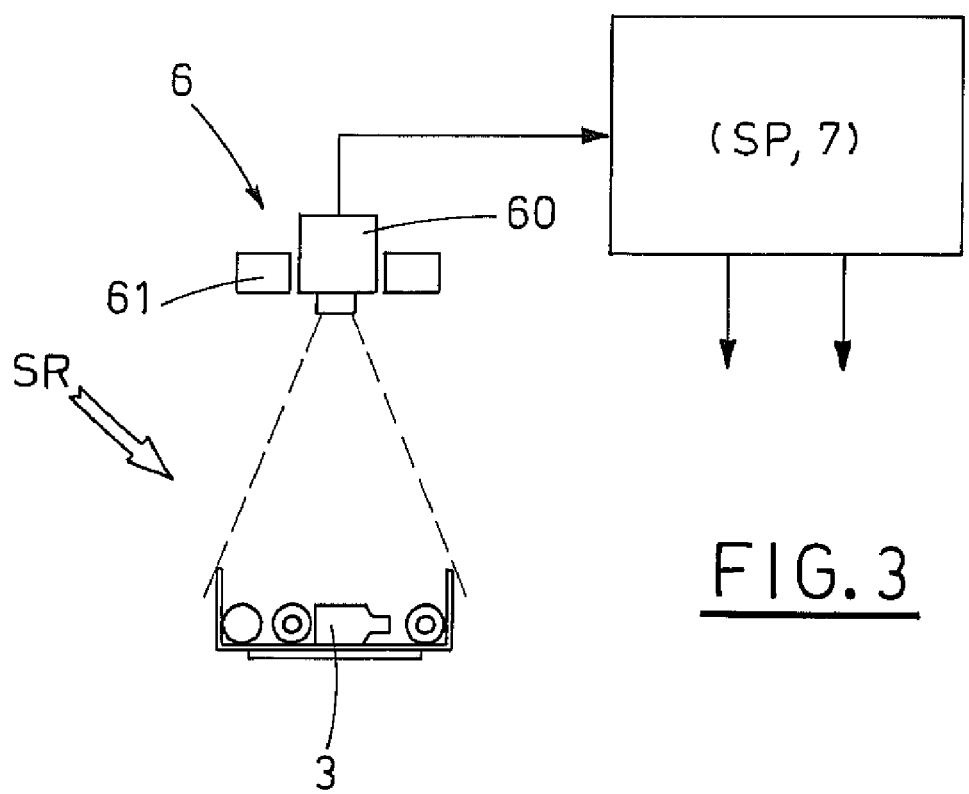

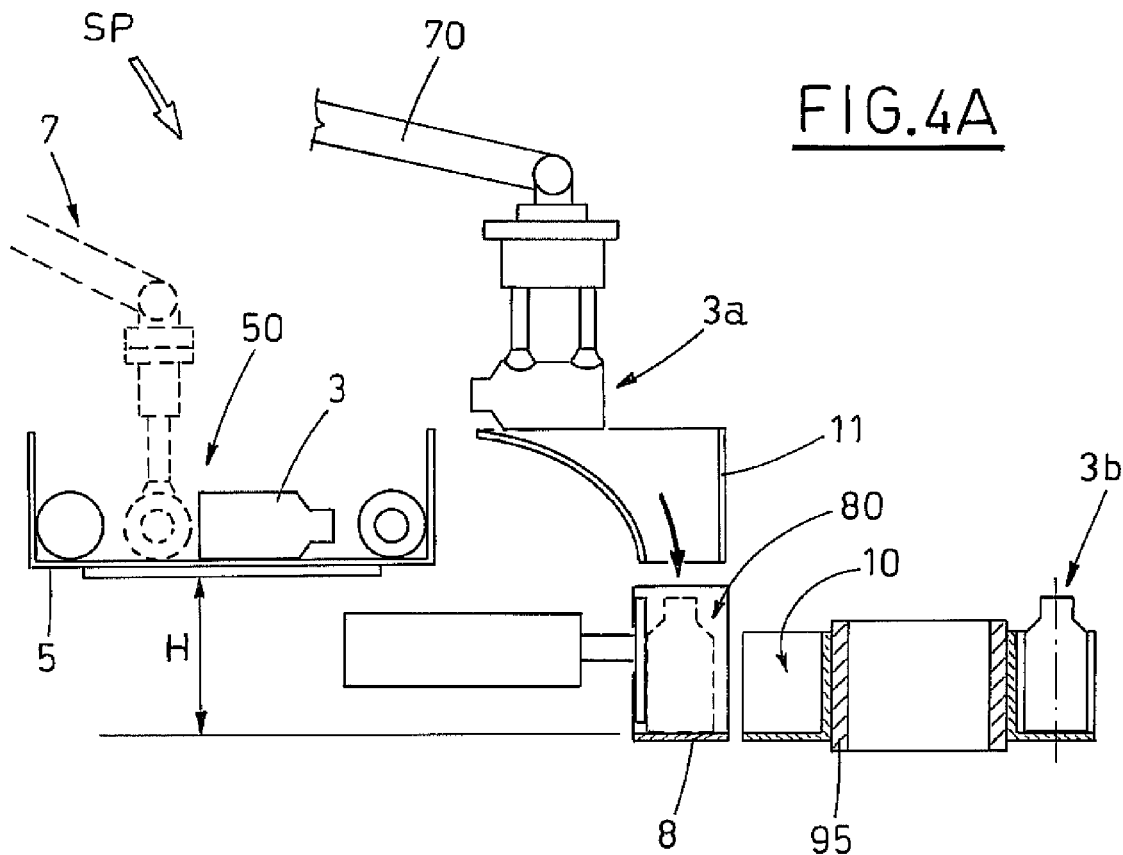
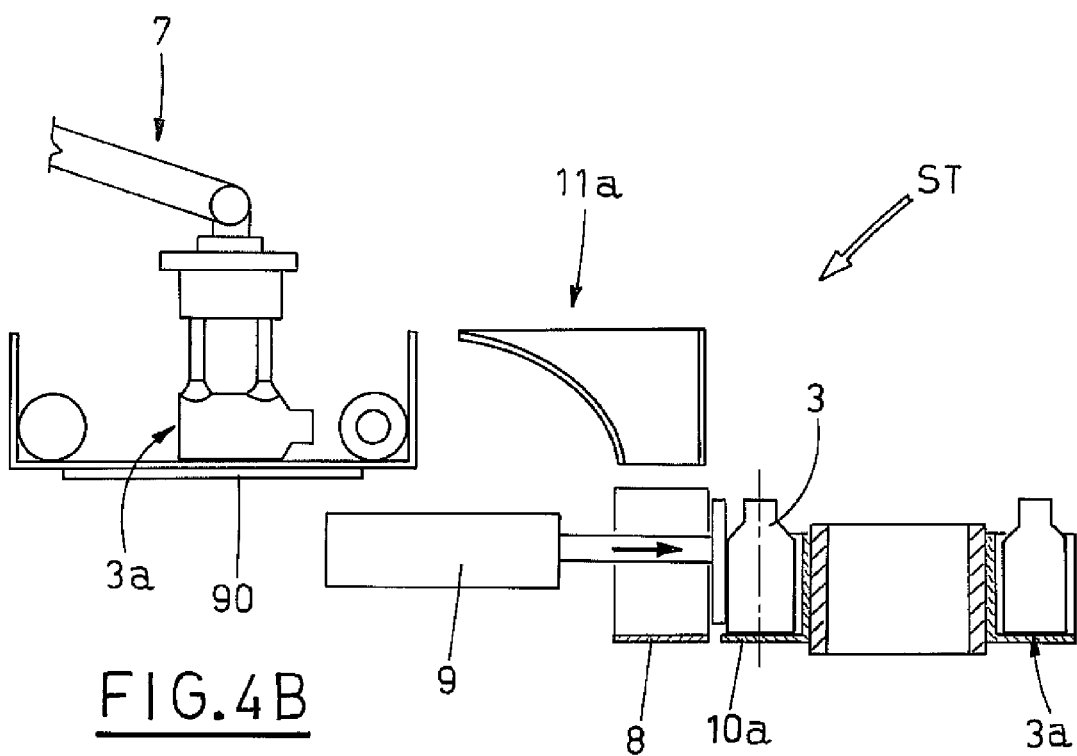

METHOD AND AN APPARATUS FOR ORDERED SUPPLY OF CONTAINERS TO AN AUTOMATIC MACHINE

BACKGROUND OF THE INVENTION

This invention concerns the technical sector regarding the supplying of containers to an automatic machine, preferably in a sterile environment.

More in particular, it concerns a method, and the relative apparatus, for the ordered supply of initially loosely-arranged containers to a sterile machine, for example, for filling the containers.

Mechanical-pneumatic sorter apparatuses are known which receive loosely arranged vials and synchronizedly supply machines operating in a sterile environment downstream.

These machines consist of a hopper, which receives loosely arranged vials and cooperates with an inclined rotating disc peripherally provided with a series of suitably-shaped seatings which receive a single vial at a time.

The diameter of the rotating disc varies between 100 and 150 cm, according to production capacity, and is constituted by a series of sectors which are assembled together.

The loosely-arranged vials are concentrated in the lower part of the rotating inclined disc, and, with the assistance of obstacles, deviators and pneumatic blowers, they are guided towards the peripheral seatings, the vials being inserted into the seatings in a completely random way.

A second fixed disc is provided inferiorly of the rotating disc, which second fixed disc allows the peripheral seatings to be partially closed, thereby retaining the vials which are contained in the seatings.

In the upper part of the rotating inclined disk, the second fixed disc is open at a station for transferring, where the vials contained in the peripheral seatings are released, arranged vertically, onto an underlying conveyor belt, preferably of the aspirated type.

The vials are transferred onto the conveyor belt in a non-synchronized way because of the possible presence of empty seatings, that is, seatings with no vials, and therefore the vials cannot directly supply a machine, for example a filling machine.

Therefore a further device for synchronizing the vials must be interposed between the filling machine and the aspirated conveyor belt.

When a vial format changeover takes place, it is necessary to substitute the whole disc, that is, all of its component sectors, and the relative shaped peripheral seatings.

Format changeover for vials handled by similar mechanical-pneumatic sorting machines is extremely expensive and difficult from both the point of view of the costs and sterilization.

From the financial point of view in fact, since each format requires a large number of components, with their attendant bulk, long downtimes must be reckoned with for dismantling and fitting the components.

As far as sterilization is concerned, the large number of components necessary for each format means long, laborious and expensive sterilization stages.

SUMMARY OF THE INVENTION

The aim of this invention is to obviate the abovementioned drawbacks by providing a method for ordered supply of containers to an automatic machine, preferably in a sterile environment, which method can significantly increase the productivity of the operating process in comparison to the prior art, while at the same time limiting the attendant costs, overall bulk and complexity of the apparatus.

In addition, a further aim of this invention is to provide an apparatus for the ordered supply of containers to an automatic machine, preferably in a sterile environment, which apparatus ensures that format changeover operations are characterized by an extremely limited number of component substitutions, thus allowing particularly short downtimes for dismantling and/or fitting.

A further aim of the invention is to provide an apparatus in which the number of components requiring sterilization is extremely limited, thus advantageously reducing sterilization-linked costs.

The above mentioned aims are achieved by means of an apparatus, and a method which are the objects of claims 1 and 8 respectively.

According to claim 1, it is disclosed a method for supplying containers to an automatic machine, with the containers exhibiting at least one support base and a longitudinal axis perpendicular to the support base, characterized in that it includes the following operating stages: supplying the containers in a loose arrangement to a plurality of underlying trays which are removably borne by a first conveyor belt having a vertical axis, in such a way that the containers form a single layer of containers which are loosely arranged in the trays with a substantially horizontally-oriented longitudinal axis; detecting the position of each container of the loosely-arranged single layer of containers in the corresponding tray; on the basis of data received from the detection operation, picking up each container loosely arranged in the tray and releasing the container onto a fixed plane which restingly receives the support bases of the containers in housings having a predetermined interaxis; the pick-up operation being performed on the basis of the information received from the previous detection operation; coplanarly translating, in a substantially horizontal way, the containers which are restingly positioned in the housings towards corresponding facing seatings associated to a step-activated, second conveyor belt having a vertical axis; supplying the containers borne by the second conveyor belt to an associated automatic machine.

According to claim 8, it is disclosed an apparatus for the ordered supply of containers to an automatic machine, the containers exhibiting at least a support base and a longitudinal axis perpendicular to the support base, characterized in that it comprises: a supply station in which conveyor means operate to supply containers in a loose arrangement to a plurality of underlying trays, which are removably borne by a first conveyor belt having a vertical axis, such as to form a single layer of loosely-arranged containers in the trays, the containers being arranged with a substantially horizontally-oriented longitudinal axis; a detecting station where detector means identify a position of each container of the single layer in the corresponding tray; a pick-up station where, based on data provided by the detector means, pick-up means pick up each loosely-arranged container in the tray, subsequently releasing the container into a terminal station, in proximity of a fixed plane affording a plurality of housings having a predetermined interaxis, which housings restingly receive the support bases of the containers; pusher means, operating in the terminal station which intercept and substantially horizontally translate a plurality of containers positioned in the housings towards relative facing seatings associated to a second conveyor belt, which has a vertical axis and which is step-activated in a phase relation with the pusher means; a bottom of each of the seatings being substantially coplanar to the housings identified by the fixed plane; the second conveyor belt supplying containers to an associated machine.

BRIEF DESCRIPTION OF THE DRAWINGS

The characteristics of the invention will emerge from the following description, in which some preferred embodiments are illustrated, with the aid of the appended figures of the drawings, which are provided by way of a non-limiting example, and in which:

FIGS. 2 and 3 show views along sections II-II, III-III of FIG. 1;

FIGS. 4A, 4B show views along section IV-IV of FIG. 1 in corresponding operating stages.

DESCRIPTION OF THE PREFERRED EMBODIMENTS

Figure 1:
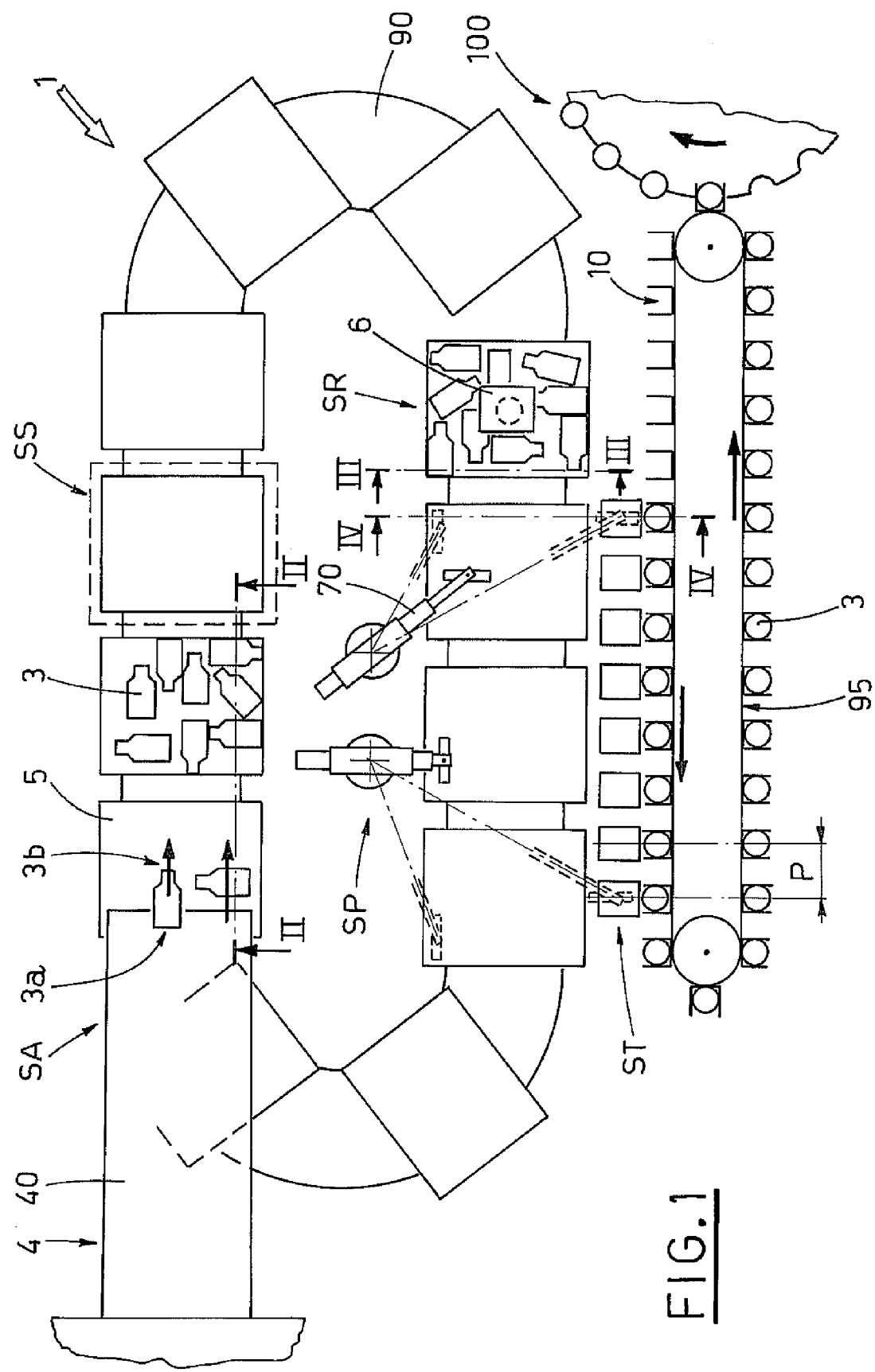
FIG. 1 schematically shows a plan view of an apparatus actuating the method of the invention.

With reference to the figures of the drawings, 1 denotes an apparatus which implements a method for ordered supply to an automatic machine of containers 3 comprising a support base 3a and a longitudinal axis 3b perpendicular thereto, which method includes the following operating stages:

supplying containers 3, which are loosely arranged in a plurality of underlying trays 5 removably borne by a first conveyor belt 90 having a vertical axis, in such a way that a single layer 50 of loosely arranged containers 3 which are preferably not superposed one on the other is formed in the trays 5, the longitudinal axis 3b being substantially horizontal;

detecting the position of each loosely arranged container 3 of the single layer 50 in the corresponding tray 5;

on the basis of this detection operation, picking up each loosely arranged container 3 in the tray 5 and releasing the container 3 onto a fixed plane 8 which restingly receives the support bases 3a of the containers 3 in housings 80 having a predetermined interaxis P;

coplanarly translating a plurality of containers 3, which are restingly positioned in the housings 80, toward corresponding facing seatings 10 which are associated to a second conveyor belt 95 having a vertical axis;

supplying the containers 3 carried by the second conveyor belt 95 to an associated automatic machine 100.

With particular reference to FIGS. 4A, 4B, according to a preferred mode of operation, the method provided comprises picking up each loosely arranged container 3 in the tray 5 and subsequently releasing the container 3 with a substantially horizontal longitudinal axis 3b, at the mouth 11a of a relative inclined orientation channel 11, which is so shaped that it restingly guides the container 3 on the underlying housing 80 of the fixed plane 8, with a substantially vertical longitudinal axis 3b.

Alternatively, according to a further mode of operation, the method comprises picking up each loosely arranged container 3 in the tray 5 and subsequently directly releasing each container 3 restingly on a housing 80 of the fixed plane 8, with a substantially vertical longitudinal axis 3b.

In a still further mode of operation the method on the invention can advantageously comprise subjecting each tray 5 to a vibrating action, preliminarily to detecting the position of each container 3 contained in each tray 5, thus causing the containers 3 of the single layer 50 in the tray 5 to be uniformly distributed.

Advantageously, each operating stage described above takes place in a laminar flow of sterile gas, and the machine 100 associated to the second conveyor 95 can be of the sterile type, for example, designed for performing a filling operation on the containers 3.

Translation of the containers 3 from the housings 80 to the seatings 10 of the step-activated second belt 95 can take place in single groups, or in multiple groups, that is, which are constituted by a plurality of simultaneously intercepted containers 3.

The containers 3 advantageously comprise sterile vials made of plastic material.

With reference to the appended tables, the apparatus 1 which implements the operating stages of the method comprises a supply station SA in which conveying means 4 operate, supplying loosely arranged containers 3, for example sterile vials made of plastic material, to a plurality of underlying trays 5 carried by a first conveyor belt 90 with a vertical axis, in such a way as to form a single layer 50 of loosely arranged vials 3 inside the trays 5, substantially with horizontally oriented longitudinal axis 3b; and a detecting station SR where detector means 6 operate, detecting the position of each vial 3 of the single layer 50 in the corresponding tray 5.

The conveyor means 4 comprise a vibrating plane 40, which is positioned superiorly to the first conveyor belt 90 and has transversal dimensions which are no greater that the transversal dimensions of the trays 5 (FIG. 2).

The frequency of vibration of the plane 40 and the speed of advancement of the underlying first belt 90 are predetermined in such a way as to optimize the formation of a single layer 50 of vials 3 in each tray 5.

The trays 5 are removably borne by the first belt 90 and are made of any material, for example metal (stainless steel), which can be sterilized; in particular the bottoms of the trays 5, which restingly receive the vials 3, can be made of any material (not necessarily the same material as the sides of the trays 5) which can exert friction on the vials 3 such as to cause the vials 3 released by the vibrating plate 40 to settle, thus forming the single layer 50, and at the same time stabilizing the position of the vials 3 after the reading by the detector means 6.

The detector means 6 comprise optical detector systems 60, possibly assisted by lighting groups 61, which are positioned superiorly to the first conveyor belt 90, preferably near the mid-line of the trays 5 as calculated relative to the direction of advancement of the trays 5 (FIG. 3).

Downstream of the detecting station SR, the apparatus 1 comprises a pick-up station SP where pick-up means 7 operate which, based on the information received from the detector means 6, pick up each vial 3 loosely arranged in the tray 5 and release it at a terminal station ST, in proximity of a fixed plane 8 affording a plurality of housings 80 having a predetermined interaxis P, which housings 80 restingly receive the support bases 3a of the containers 3.

In the terminal station ST, pusher means 9 having a substantially horizontal axis operate, intercepting and translating the vials 3, which are restingly positioned in the housings 80, towards corresponding facing seatings 10, which are associated to a second conveyor belt 95 with a vertical axis, the bottom 10a of each seating 10 advantageously being substantially coplanar to the housings 80 defined by the fixed plane 8.

The housings 80 defined by the fixed plane 8 are provided at a height H which is lower than that of the first conveyor belt 90.

As already mentioned, translation of the vials 3 from the housings 80 to the seatings 10 of the stepwise activated second belt 95 can take place in single groups or in multiple groups, that is, constituted by a plurality of simultaneously intercepted vials 3.

It is easy to understand how the second conveyor belt 95 supplies vials 3 in an ordered way to an associated automatic machine 100, for example a sterile machine for filling vials 3.

In a preferred embodiment of the apparatus 1, which implements the corresponding preferred operating stage of the method of the invention, the pick-up means 7 release each vial 3 picked up in the tray 5 with a substantially horizontal longitudinal axis 3b, at the mouth 11a of a relative inclined channel 11, which is so shaped that it restingly guides the container 3 on the underlying housing 80 of the fixed plane 8 with the axis 3b thereof being substantially vertical (FIGS. 4A, 4B).

In a further embodiment, at the same operating stage of the method, the pick-up means 7 release each vial 3, picked up in the tray 5, resting directly on a corresponding housing 80 of the fixed plane 8, with a substantially vertical longitudinal axis 3b.

The pick-up means 7 comprise at least one handling arm 70, preferably two consecutive arms 70, located in the inner area which is defined by the essentially coplanar branches of the first conveyor belt 90, and preferably projecting from the lower region of the first conveyor belt 90.

Downstream of the supply station SA, the apparatus 1 of the invention can also comprise a stabilizer station SS, where vibrating means operate, leading to uniform distribution of the vials 3 of the single layer 50 in each tray 5.

Advantageously the supply station SA, the detector station SR, the pick-up station SP, the terminal station ST and the stabilizer station SS of the apparatus 1 are subjected to a laminar flow of sterile gas; the automatic machine 100 associated to the second conveyor 95 is of the sterile type.

From the aforesaid it is clear that the apparatus which implements the method of the invention for the ordered supply of containers to an automatic machine, preferably in a sterile environment, ensures extremely rapid and flexible format changeover operations, and is characterized by extremely contained and limited financial and sterilization costs.

In fact, compared with the prior art, the vial format changeover operation does not necessarily require substitution of the trays, since the vials are freely and loosely positioned in a single layer in the trays, and neither does it require the substitution of the optical detector means, nor even substitution of the pick-up means. In general, format changeover can require substitution of the inclined channels, which receive the horizontal vials and vertically orient them, and possibly substitution of the seatings of the second conveyor belt.

However, in the case of vials having the same supporting base, that is, the same base diameter, albeit with a different height, it is possibly unnecessary to substitute either the channels or the seatings of the second belt.

In the case of sterilization, to be performed for example during a vial format changeover and/or a vial batch changeover, the number of components requiring the corresponding autoclave procedure is extremely limited.

This also has a positive influence on the financial costs linked to the times required for fitting/dismounting new and old components.

In the case of sterilization, only those elements which can potentially enter into contact with the mouths of the vials, that is, the vibrating plate, the trays and the inclined channels, must compulsorily be put in the autoclave, since the pick-up means only come into contact with the lateral surface of the vials, and both the housings of the fixed plane and the seatings of the second conveyor enter into contact only with the support bases.

The method of the invention thus enables the productivity of the operating process to be increased significantly in comparison with the prior art, while limiting the costs, bulk and complexity of the apparatus which implements the operating stages of the method.

The method and apparatus of the invention are particularly suited to plastic vials used for eye-drops, ophthalmic products and the like, for which autoclave sterilization cannot be performed because of structural problems related to the material the vials are made of; in such cases in fact, sterilization is performed during the production stage, at the end of which vials are inserted into aseptic bags.

The invention has been described with the aid of the appended figures of the drawings, which are provided by way of a non-limiting example; obviously all modifications and variants can be brought to the invention without its forsaking the ambit of protection as defined in the following claims.

What is claimed:

1. A method for supplying containers to an automatic machine, with the containers exhibiting at least one support base and a longitudinal axis perpendicular to the support base, wherein it includes the following operating stages:
   supplying the containers in a loose arrangement to a plurality of underlying trays which are removably borne by a first conveyor belt having a vertical axis, in such a way that the containers form a single layer of containers which are loosely arranged in the trays with a substantially horizontally-oriented longitudinal axis;
   detecting the position of each container of the loosely-arranged single layer of containers in the corresponding tray;
   on the basis of data received from the detection operation, picking up each container loosely arranged in the tray and releasing the container onto a fixed plane which restingly receives the support bases of the containers in housings having a predetermined interaxis P; the pick-up operation being performed on the basis of the information received from the previous detection operation;
   coplanarly translating, in a substantially horizontal way, the containers which are restingly positioned in the housings towards corresponding facing seatings associated to a step-activated, second conveyor belt having a vertical axis;
   supplying the containers borne by the second conveyor belt to an associated automatic machine.

2. The method of claim 1, wherein it comprises picking up each loosely-arranged container from the tray and subsequently releasing the container, the longitudinal axis of the container being substantially horizontal, at the mouth of a relative inclined orientation channel, shaped in such a way as to guide the container restingly onto the underlying housing of the fixed plane, with a substantially vertical longitudinal axis.

3. The method of claim 1, wherein it comprises picking up each loosely-arranged container in the tray and then directly releasing the container restingly onto the underlying housing of the fixed plane, with a substantially vertical longitudinal axis.

4. The method of claim 1, wherein it comprises forming a single layer of containers in the trays, the containers being loosely arranged and not superposed one on another in the trays.

5. The method of claim 1, wherein before detecting the position of each container contained in each tray, each tray is subjected to a vibrating action which allows uniform distribution of the containers of the single layer in the tray.

6. The method of claim 1, wherein the containers are constituted by sterile vials made of plastic material.

7. The method of claim 1, wherein each operating stage is performed within a flow of sterile gas, the machine which is associated to the second conveyor being of a sterile type.

8. An apparatus for the ordered supply of containers to an automatic machine, the containers exhibiting at least a support base and a longitudinal axis perpendicular to the support base, wherein it comprises: a supply station in which conveyor means operate to supply containers in a loose arrangement to a plurality of underlying trays, which are removably borne by a first conveyor belt having a vertical axis, such as to form a single layer of loosely-arranged containers in the trays, the containers being arranged with a substantially horizontally-oriented longitudinal axis; a detecting station where detector means identify a position of each container of the single layer in the corresponding tray; a pick-up station where, based on data provided by the detector means, pick-up means pick up each loosely-arranged container in the tray, subsequently releasing the container into a terminal station, in proximity of a fixed plane affording a plurality of housings having a predetermined interaxis, which housings restingly receive the support bases of the containers; pusher means, operating in the terminal station which intercept and substantially horizontally translate a plurality of containers positioned in the housings towards relative facing seatings associated to a second conveyor belt, which has a vertical axis and which is step-activated in a phase relation with the pusher means; a bottom of each of the seatings being substantially coplanar to the housings identified by the fixed plane; the second conveyor belt supplying containers to an associated machine.

9. The apparatus of claim 8, wherein it comprises pick-up means which release each container, previously picked up from the tray, with a substantially horizontal longitudinal axis at a mouth of a relative inclined channel, which channel is shaped in such a way as to guide the container onto the underlying housing of the fixed plane, with a substantially vertical longitudinal axis.

10. The apparatus of claim 8, wherein it comprises pick-up means which release each container picked up from the tray, directly onto a corresponding housing of the fixed plane, with a substantially vertical longitudinal axis.

11. The apparatus of claim 8, wherein downstream of the supply station it comprises a stabilizing station, where vibrating means operate which cause uniform distribution in each tray of the containers of the single layer.

12. The apparatus of claim 8, wherein it comprises the housings identified by the fixed plane at a height which is lower than a height of the first conveyor belt.

13. The apparatus of claim 8, wherein the pick-up means comprise at least one handling arm which is positioned in an inner area defined by branches of the first conveyor belt.

14. The apparatus of claim 8, wherein the detector means comprise optical detecting systems which are positioned superiorly of the first conveyor belt, preferably in proximity of the half-way line of the trays assessed relative to the advancement direction of the trays.

15. The apparatus of claim 8, wherein the conveyor means comprise a vibrating plane, which is arranged superiorly to the first conveyor belt, and which exhibits transversal dimensions which are not greater than transversal dimensions of the trays.

16. The apparatus of claim 8, wherein the containers are constituted by sterile vials made of a plastic material.

17. The apparatus of claim 8, wherein the stations are subjected to a flow of sterile gas; the machine associated to the second conveyor being of a sterile type.

* * * * *